United States Patent
Kumabe

(10) Patent No.: US 10,339,731 B2
(45) Date of Patent: **\*Jul. 2, 2019**

(54) IN-VEHICLE UNIT AND IN-VEHICLE UNIT DIAGNOSIS SYSTEM

(71) Applicant: DENSO CORPORATION, Kariya, Aichi-pref. (JP)

(72) Inventor: Seigou Kumabe, Kariya (JP)

(73) Assignee: DENSO CORPORATION, Kariya, Aichi-pref. (JP)

( \* ) Notice: Subject to any disclaimer, the term of this patent is extended or adjusted under 35 U.S.C. 154(b) by 56 days.

This patent is subject to a terminal disclaimer.

(21) Appl. No.: 15/537,252

(22) PCT Filed: Dec. 22, 2015

(86) PCT No.: PCT/JP2015/006365
§ 371 (c)(1),
(2) Date: Jun. 16, 2017

(87) PCT Pub. No.: WO2016/116991
PCT Pub. Date: Jul. 28, 2016

(65) Prior Publication Data
US 2017/0345231 A1    Nov. 30, 2017

(30) Foreign Application Priority Data

Jan. 19, 2015  (JP) ................ 2015-007768

(51) Int. Cl.
| | |
|---|---|
| *H04W 4/04* | (2009.01) |
| *G07C 5/08* | (2006.01) |
| *H04W 88/02* | (2009.01) |
| *G07C 5/00* | (2006.01) |
| *H04W 4/80* | (2018.01) |
| *H04L 29/08* | (2006.01) |

(52) U.S. Cl.
CPC ............ *G07C 5/085* (2013.01); *G07C 5/008* (2013.01); *H04W 4/04* (2013.01); *H04W 4/80* (2018.02); *H04W 88/02* (2013.01); *H04L 67/12* (2013.01)

(58) Field of Classification Search
CPC ......... G07C 5/085; G07C 5/008; H04W 4/80; H04W 4/04; H04W 88/02; H04L 67/12
See application file for complete search history.

(56) References Cited

U.S. PATENT DOCUMENTS

2017/0352201 A1\* 12/2017 Kumabe ................ G07C 5/008

FOREIGN PATENT DOCUMENTS

| JP | 2007048302 A | 2/2007 |
| JP | 2012004759 A | 1/2012 |
| JP | 2013109746 A | 6/2013 |

OTHER PUBLICATIONS

Hattori et al., Development and Evaluation of Its Information Communication System for Electric Vehicle, 2012, IEEE, p. 1-6 (Year: 2012).\*

(Continued)

*Primary Examiner* — McDieunel Marc
(74) *Attorney, Agent, or Firm* — Harness, Dickey & Pierce, P.L.C.

(57) ABSTRACT

In-vehicle units are on host vehicles including a subject vehicle and at least one nearby vehicle. Each in-vehicle unit transmits and receives information using inter-vehicle communication, acquires information indicating state of a control system controlling operation of each in-vehicle unit, generates an index data-item including an index value indicating state of the control system based on the acquired information, and transmits the generated index data-item using inter-vehicle communication. A subject in-vehicle unit in the subject vehicle includes: a communication processing section acquiring an index data-item from the nearby vehicle; a determination criterion specification section successively specifying a self-unit determination criterion being a determination criterion determining whether the control system in the subject in-vehicle unit operates normally, based on the index data-item; and a self-unit diagnosis test (Continued)

section determining whether the control system in the subject in-vehicle unit operates normally by comparing the self-unit determination criterion with the index data-item in the subject in-vehicle unit.

11 Claims, 4 Drawing Sheets

(56) References Cited

OTHER PUBLICATIONS

Li et al., VehicleView: a universal system for vehicle performance monitoring and analysis based on VANETs, 2012, IEEE, p. 9096 (Year: 2012).*

Xiumin et al., Design of In-Vehicle Comprehensive Acquisition System on Freeway Condition under Adverse Weather, 2008, IEEE, p. 879-884 (Year: 2008).*
Takatori et al., A study of driving assistance system based on a fusion network of inter-vehicle communication and in-vehicle external sensors, 2011, IEEE, p. 254-259 (Year: 2011).*
Hawas et al., Infrastructureless Inter-Vehicular Real-Time Route Guidance, 2008, IEEE, p. 1213-1219 (Year: 2008).*
Dietzel et al., In-Network Aggregation for Vehicular Ad Hoc Networks, 2014, IEEE, p. 1909-1932 (Year: 2014).*
Zardosht et al., An in-vehicle tracking method using vehicular ad-hoc networks with a vision-based system, 2014, IEEE, p. 3022-3029 (Year: 2014).*
Ellison et al., The car as an Internet-enabled device, or how to make trusted networked cars, 2012, IEEE, p. 1-8 (Year: 2012).*
U.S. Appl. No. 15/537,192, filed Jun. 16, 2017, Kumabe.
U.S. Appl. No. 15/537,237, filed Jun. 16, 2017, Kumabe.

* cited by examiner

IN-VEHICLE UNIT AND IN-VEHICLE UNIT DIAGNOSIS SYSTEM

CROSS REFERENCE TO RELATED APPLICATIONS

This application is a U.S. National Phase Application under 35 U.S.C. 371 of International Application No. PCT/JP2015/006365 filed on Dec. 22, 2015 and published in Japanese as WO 2016/116991 A1 on Jul. 28, 2016. This application is based on and claims the benefit of priority from Japanese Patent Application No. 2015-007768 filed on Jan. 19, 2015. The entire disclosures of all of the above applications are incorporated herein by reference.

TECHNICAL FIELD

The present disclosure relates to an in-vehicle unit to perform inter-vehicle communication and an in-vehicle unit diagnosis system to diagnose the in-vehicle unit.

BACKGROUND ART

Recently, there is proposed a system in which an in-vehicle unit mounted on each of a plurality of vehicles (referred to as host vehicles) wirelessly communicates with the other in-vehicle units existing in a predetermined range from the in-vehicle unit itself without using a wide area communication network. This type of communication between in-vehicle units is generally referred to as inter-vehicle communication.

There is also proposed a system in which an in-vehicle unit to perform the inter-vehicle communication exchanges predetermined information with a service provision terminal (such as a roadside instrument) to provide predetermined services and thereby permit the use of services provided by the service provision terminal. For example, a proposed system causes the in-vehicle unit to provide the service provision terminal with information about the in-vehicle unit itself such as current position information and thereby permit the use of services corresponding to the current position.

Patent Literature 1 discloses an in-vehicle unit that detects a parameter indicating a communication state during communication with other in-vehicle units and detects a predetermined communication error by comparing the detected parameter with a predetermined value. The in-vehicle unit according to Patent Literature 1 diagnoses whether the in-vehicle unit operates normally, based on the number of occurrences of the communication error.

PRIOR ART LITERATURES

Patent Literature

Patent Literature 1: JP 2012-004759 A

SUMMARY OF INVENTION

The in-vehicle unit communicates with the service provision terminal to use a service. To do this, software to use the service needs to be executed normally.

However, for example, a defect may occur in an internal system (hereinafter referred to as a control system) that controls operation of the in-vehicle unit. The defect may disable normal execution of the software to use the service. The service is unavailable when the software to use the service is not executed normally. It is therefore favorable to timely diagnose whether the control system for the in-vehicle unit operates normally.

The control system for the in-vehicle unit is likely to be subject to a type of defect that hinders settlement of a threshold value to detect the defect.

For example, the control system is likely to be subject to a defect when CPU utilization of the in-vehicle unit remains relatively high for a predetermined time or longer. However, the CPU utilization of the in-vehicle unit varies with the type of a program being executed or the number of in-vehicle units that perform the inter-vehicle communication. The event of continued high CPU utilization of the in-vehicle unit may be observed even when the control system operates normally.

Namely, only because the CPU utilization remains higher than or equal to a predetermined threshold value for a specified time or longer, the control system is not considered as operating abnormally. The control system may be incorrectly determined to operate abnormally even though the control system operates normally in a mode that uses an already designed (i.e., fixed) threshold value to determine whether the control system operates normally. In other words, it is difficult to previously set an appropriate threshold value used to detect a defect in the control system to an index value indicating the control system state such as the CPU utilization, for example.

It is an object of the present disclosure to provide an in-vehicle unit and an in-vehicle unit diagnosis system capable of determining whether an in-vehicle unit system operates normally.

To achieve the object, according to a first example of the present disclosure, an in-vehicle unit that is mounted on each of a plurality of host vehicles including a subject vehicle and at least one nearby vehicle near the subject vehicle is provided as follows. The in-vehicle unit used in each host vehicle includes: a wireless communicator that transmits and receives information using inter-vehicle communication; a system information acquisition section that acquires information indicating a state of a control system to control operation of the in-vehicle unit in each host vehicle; and an index data generation section that generates an index data-item including an index value indicating a state of the control system based on the information acquired by the system information acquisition section, the generated index data-item being transmitted via the wireless communicator. The in-vehicle unit used in the subject vehicle, which is referred to as a subject in-vehicle unit, includes a communication processing section, a determination criterion specification section, and a self-unit diagnosis test section. The communication processing section acquires, via the wireless communicator, an index data-item transmitted from at least one nearby in-vehicle unit being the in-vehicle unit used in the at least one nearby vehicle. The determination criterion specification section successively specifies a self-unit determination criterion being a determination criterion to determine whether the control system in the subject in-vehicle unit operates normally, based on the index data-item acquired by the communication processing section from the at least one nearby in-vehicle unit. The self-unit diagnosis test section determines whether the control system in the subject in-vehicle unit operates normally by comparing the self-unit determination criterion specified by the determination criterion specification section with the index data-item in the subject in-vehicle unit.

According to the above-mentioned configuration, the determination criterion specification section uses an index data-item received from the in-vehicle unit (nearby in-vehicle unit) of the nearby vehicle and successively specifies a determination criterion to determine whether the control system for the in-vehicle unit (subject in-vehicle unit) of the subject vehicle operates normally. The self-unit diagnosis test section compares the determination criterion specified by the determination criterion specification section with the index data-item for the subject in-vehicle unit and thereby determines whether the control system operates normally.

Several nearby in-vehicle units provide index data-items as a source to generate the determination criterion and all exist in a relatively small range capable of inter-vehicle communication with the subject in-vehicle unit.

The nearby in-vehicle units all exist in a relatively small range around the subject in-vehicle unit. Therefore, the number of in-vehicle units with which the subject in-vehicle unit performs inter-vehicle communication is highly likely to be similar to the number of in-vehicle units with which each of the nearby in-vehicle units performs inter-vehicle communication. The subject in-vehicle unit may communicate with the service provision terminal to use a service. In such a case, the nearby in-vehicle unit is also expected to communicate with the service provision terminal to use a service.

Namely, the subject in-vehicle unit and the nearby in-vehicle unit are highly likely to have the software performed by the control system such as an application program to use services or the size of a load (the number of tasks to be processed) on the control system in common. The CPU utilization or the memory usage is highly likely to similar in the in-vehicle units when the subject in-vehicle unit and the nearby in-vehicle unit perform the same software or show the similarity in the number of tasks to be processed.

When the subject in-vehicle unit operates normally, the state of the control system is highly likely to be similar to the state of the control system for the nearby in-vehicle unit. The index data-item for the subject in-vehicle unit is therefore supposed to be similar to the index data-item acquired from the nearby in-vehicle unit.

It is relatively less likely that all of the nearby in-vehicle units operate abnormally at the same time. The self-unit determination criterion, which is dynamically specified based on the index data-item(s) acquired from the nearby in-vehicle unit(s), comes to indicate the normal state of the control system under the instantaneous situation.

It is therefore possible to determine whether the control system for the subject in-vehicle unit operates normally, by comparing the self-unit determination criterion specified based on the index data-item(s) acquired from the nearby in-vehicle unit(s) with the index data-item for the subject in-vehicle unit.

To achieve the above object, according to a second example of the present disclosure, an in-vehicle unit that is used in each of a plurality of host vehicles including a subject vehicle and at least one nearby vehicle near the subject vehicle is provided as follows. The in-vehicle unit used in each host vehicle includes: a wireless communicator that transmits and receives information using inter-vehicle communication; a system information acquisition section that acquires information indicating a state of a control system to control operation of the in-vehicle unit in each host vehicle; and an index data generation section that generates an index data-item including an index value indicating a state of the control system based on the information acquired by the system information acquisition section, the generated index data-item being transmitted via the wireless communicator. The in-vehicle unit used in the subject vehicle, which is referred to as a subject in-vehicle unit, includes a communication processing section, a determination criterion specification section, and a different-unit diagnosis test section. The communication processing section acquires, via the wireless communicator, an index data-item transmitted from at least one nearby in-vehicle unit being the in-vehicle unit used in the at least one nearby vehicle. The determination criterion specification section successively specifies a different-unit determination criterion being a determination criterion to determine whether the control system in a target nearby in-vehicle unit as a predetermined diagnosis target among the at least one nearby in-vehicle operates normally, based on an index data-item acquired by the communication processing section from the at least one nearby in-vehicle unit. The different-unit diagnosis test section determines whether the control system in the target nearby in-vehicle unit operates normally, by comparing the different-unit determination criterion specified by the determination criterion specification section with the index data-item acquired by the communication processing section from the target nearby in-vehicle unit.

According to the above-mentioned configuration, the determination criterion specification section uses an index data-item received from the in-vehicle unit (nearby in-vehicle unit) of the nearby vehicle to successively specify a different-unit determination criterion used to determine whether the control system for the in-vehicle unit (target nearby in-vehicle unit) of a target nearby vehicle as a diagnosis target. The different-unit diagnosis test section uses the different-unit determination criterion specified by the determination criterion specification section to determine whether the control system for the nearby in-vehicle unit as a diagnosis target operates normally.

According to this configuration, a behavior similar to the first example can determine whether the control system for the nearby in-vehicle unit operates normally.

Further, to achieve the above object, according to a third example of the present disclosure, an in-vehicle unit diagnosis system is provided as including a plurality of in-vehicle units respectively provided in a plurality of host vehicles including a subject vehicle and at least one nearby vehicle near the subject vehicle, the plurality of in-vehicle units performing inter-vehicle communication. The in-vehicle unit used in each host vehicle includes: a wireless communicator that transmits and receives information using inter-vehicle communication; a system information acquisition section that acquires information indicating a state of a control system to control operation of the in-vehicle unit in each host vehicle; and an index data generation section that generates an index data-item including an index value indicating a state of the control system based on the information acquired by the system information acquisition section, the generated index data-item being transmitted via the wireless communicator. A subject in-vehicle unit being the in-vehicle unit used in the subject vehicle includes a communication processing section, a determination criterion specification section, and a different-unit diagnosis test section. The communication processing section acquires, via the wireless communicator, an index data-item transmitted from at least one nearby in-vehicle unit being the in-vehicle unit used in the at least one nearby vehicle. The determination criterion specification section successively specifies a different-unit determination criterion being a determination criterion to determine whether the control system in a target nearby in-vehicle unit as a predetermined diagnosis target among the at least one nearby in-vehicle operates normally, based on an index data-item acquired by the communication processing section from the at least one nearby in-vehicle unit. The different-unit diagnosis test section determines whether the control system in the target nearby in-vehicle unit operates normally, by comparing the different-unit determination criterion specified by the determination criterion specification section with the index data-item acquired by the communication processing section from the target nearby in-vehicle unit.

This in-vehicle unit diagnosis system is embodied by including several in-vehicle units each having the above-mentioned configuration as the second example of the in-vehicle unit. A behavior similar to the second example of the above-mentioned in-vehicle unit can allow each of the in-vehicle units in the in-vehicle unit diagnosis system to determine whether the control system for the other in-vehicle units operates normally.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
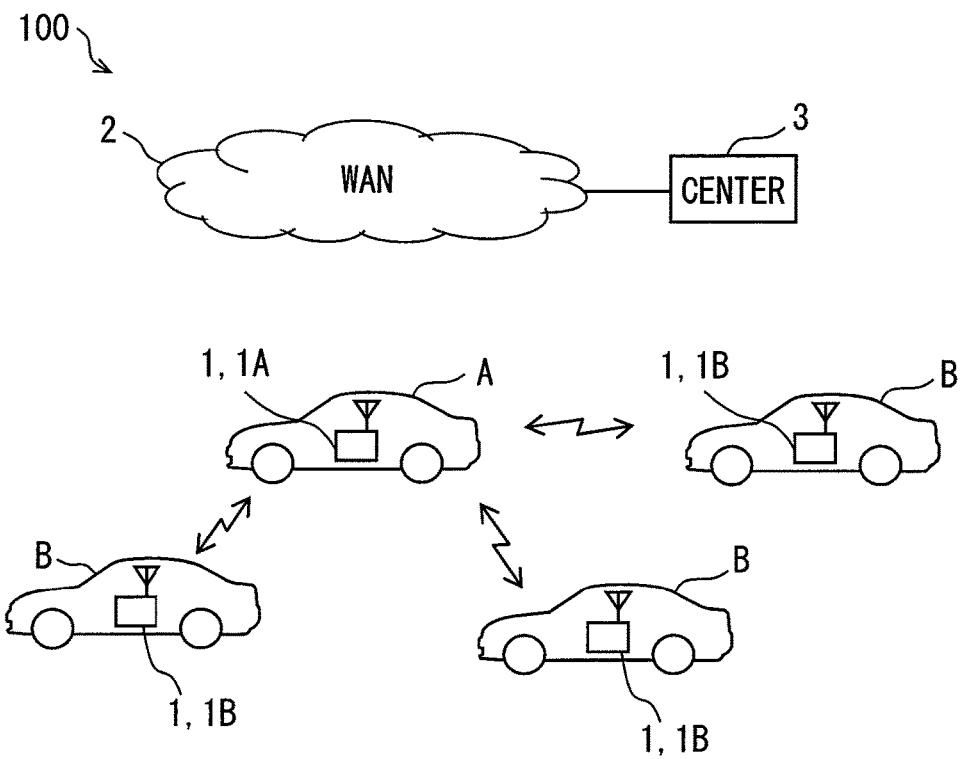
FIG. 1 is a block diagram illustrating a schematic configuration of an in-vehicle unit diagnosis system according to a present embodiment.

An embodiment of the present disclosure will be described with reference to the accompanying drawings. FIG. 1 illustrates a schematic configuration of an in-vehicle unit diagnosis system 100 according to the disclosure. The in-vehicle unit diagnosis system 100 includes an in-vehicle unit 1 and a center 3. One in-vehicle unit 1 is used in each of the vehicles. The center 3 is provided outside vehicles. The center 3 connects with a wide area communication network 2 such as a phone line network and the Internet. The in-vehicle unit 1 according to the embodiment is installed (namely mounted) on a vehicle. As another mode, the in-vehicle unit 1 may be carried into a vehicle and may be attached to or detached from a holder by a user, for example. Vehicles indicated by letters A and B in FIG. 1 are each mounted with the in-vehicle unit 1.

The in-vehicle unit 1 mounted on each vehicle uses radio waves corresponding to a predetermined frequency band to perform wireless communication (so-called inter-vehicle communication) with other in-vehicle units 1 existing in the vicinity of the self terminal without using the wide area communication network 2. The inter-vehicle communication uses radio waves corresponding to frequency bands such as 700 MHz, 5.8 through 5.9 GHz, and 2.4 GHz. The vicinity of the self terminal signifies a range capable of the inter-vehicle communication. Ranges capable of the inter-vehicle communication or the vehicle roadside communication may be designed appropriately and are often designed to be several tens to hundreds of meters.

Vehicle A is also referred to as a subject vehicle or a first vehicle. At least one or more vehicles B existing in the vicinity of vehicle A are also referred to as nearby vehicles, different vehicles, or second vehicles. The description below explains the in-vehicle unit diagnosis system 100 and the in-vehicle unit 1. Nearby vehicle B in FIG. 1 is mounted with the in-vehicle unit 1 that performs the inter-vehicle communication with the in-vehicle unit 1 mounted on subject vehicle A. The subject vehicle or the nearby vehicle signifies relative relationship. Assume that vehicle B to be a subject vehicle. Vehicle A is then assumed to be a nearby vehicle for vehicle B. A vehicle mounted with the in-vehicle unit 1 is also referred to as a host vehicle. This also applies to vehicles A and B.

The in-vehicle unit 1 mounted on subject vehicle A may be distinguished from the in-vehicle unit 1 mounted on nearby vehicle B. The in-vehicle unit 1 mounted on subject vehicle A is referred to as an in-vehicle unit 1A and also as a first in-vehicle unit 1A or a subject in-vehicle unit 1A. The in-vehicle unit 1 mounted on subject vehicle B is referred to as an in-vehicle unit 1B (namely, a nearby in-vehicle unit) and also as a second in-vehicle unit 1B or a different in-vehicle unit 1B. Therefore, at least one or more nearby in-vehicle units exist. Suppose the subject in-vehicle unit 1A is assumed to be an in-vehicle unit itself. The nearby in-vehicle unit 1B is then referred to as a different unit. Suppose the nearby in-vehicle unit 1B is assumed to be an in-vehicle unit itself. The subject in-vehicle unit 1A is then referred to as a different unit.

Each in-vehicle unit 1 may use a radio wave at a previously allocated frequency band to perform the wireless communication (so-called vehicle roadside communication) with a roadside instrument provided on or along a road without using the wide area communication network 2. Each in-vehicle unit 1 performs inter-vehicle communication or vehicle roadside communication in compliance with a publicly known communication standard to perform the inter-vehicle communication or the vehicle roadside communication. For example, the in-vehicle unit 1 performs the inter-vehicle communication or the vehicle roadside communication in compliance with the standard of IEEE1609.0 (Guide for Wireless Access in Vehicular Environment). In the description below, simply a communication terminal signifies the in-vehicle unit 1 and the roadside instrument that are not distinguished, if applicable.

Each of the communication terminals in the in-vehicle unit diagnosis system 100 is assigned an identification code (referred to as a terminal ID) to identify each of communication terminals. Data transmitted by each communication terminal includes the terminal ID of a transmitter terminal. The communication that receives the data can specify the transmitter terminal based on the terminal ID in the data.

The in-vehicle unit 1 performs the vehicle roadside communication or the inter-vehicle communication with a communication terminal (referred to as a service provision terminal) managed by a service provider that provides the in-vehicle unit 1 with predetermined services. The in-vehicle unit 1 thereby performs processes to use services provided by the service provision terminal. The service provision terminal may be provided as a roadside instrument or the in-vehicle unit 1 mounted on the vehicle. For example, the service provision terminal provides services such as automatic settlement at a drive-through, automatic settlement of parking fee at a pay parking lot, support for passing at an intersection, and provision of information about traffic congestion.

(Configuration of the In-Vehicle Unit 1)

Figure 2:
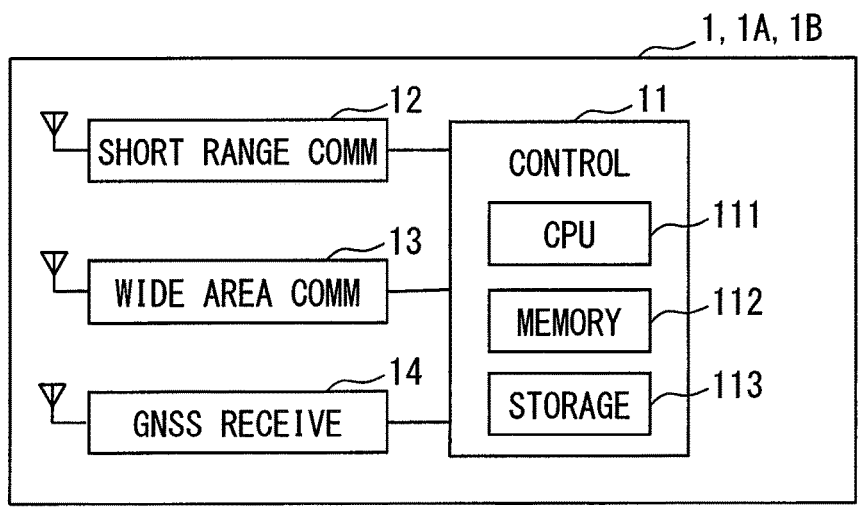
FIG. 2 is a block diagram illustrating a schematic configuration of an in-vehicle unit according to the embodiment.

The description below explains a schematic configuration of the in-vehicle unit 1 with reference to FIG. 2. As in FIG. 2, the in-vehicle unit 1 includes a controller 11, a short range communicator 12, a wide area communicator 13, and a GNSS receiver 14. The controller 11 is connected to each of the short range communicator 12, the wide area communicator 13, and the GNSS receiver 14 so as to be capable of intercommunication.

The short range communicator 12 includes an antenna capable of transmitting and receiving radio waves at frequencies used in the inter-vehicle communication or the vehicle roadside communication. The short range communicator 12 uses the antenna to wirelessly communicate with a different communication terminal (the in-vehicle unit 1 or the roadside instrument) existing near the self terminal. More specifically, the short range communicator 12 demodulates a signal received by the antenna and outputs the signal to the controller 11. The short range communicator 12 also modulates data input from the controller 11, converts the data into a radio wave, and transmits the radio wave. The short range communicator 12 is also referred to as a wireless communicator.

The wide area communicator 13 connects to the wide area communication network 2 and communicates with the center 3. The wide area communicator 13 demodulates a signal received via the wide area communication network 2 and supplies the signal to the controller 11. The wide area communicator 13 also modulates a baseband signal input from the controller 11 and transmits the signal to the center 3.

The GNSS receiver 14 receives a radio wave from a satellite (referred to as a GNSS satellite) used in GNSS (Global Navigation Satellite System) and thereby acquires information indicating a current position of the GNSS receiver 14. The current position acquired by the GNSS receiver 14 may be represented by latitude, longitude, and an altitude, for example. The altitude may be assumed to represent a height from a predetermined reference level (e.g., sea surface). The information is used as being not only uncountable but also countable.

The controller 11 is successively (e.g., every 100 milliseconds) provided with the position information acquired by the GNSS receiver 14. The GNSS receiver 14 according to the embodiment is an optional element and may be omitted. The GNSS receiver 14 is also referred to as a position information acquisition instrument or a position information acquisition interface.

The controller 11 is also referred to as an electronic controller unit or a control circuit. According to the embodiment, the controller 11 is configured as an ordinary computer that includes a known CPU 111, memory 112, a storage 113, I/O, and a bus line to connect these components. The memory 112 may be embodied as a temporary storage medium such as RAM and functions as a publicly known main storage unit. The storage 113 may be embodied as a non-volatile storage medium such as ROM or flash memory and functions as a publicly known auxiliary storage.

The storage 113 stores software and data to perform various processes and a terminal ID assigned to the in-vehicle unit 1. The software here includes an operating system and application software needed to use services provided by the above-mentioned service provision terminal, for example. The embodiment assumes that the same software is installed on each in-vehicle unit 1.

Figure 3:
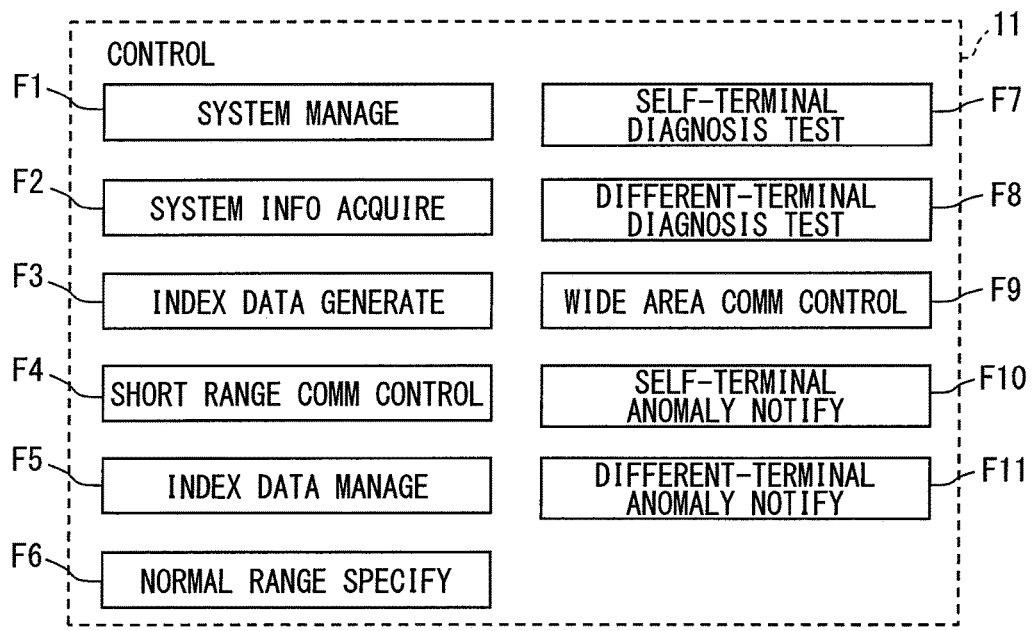
FIG. 3 is a block diagram illustrating a schematic configuration of a controller.

For example, the controller 11 according to the embodiment uses the above-mentioned software to implement function blocks in FIG. 3 such as a system management section F1 (which may be also referred to as a system manager), a system information acquisition section F2 (which may be also referred to as a system information acquirer), an index data generation section F3 (which may be also referred, to as an index data generator), a short range communication control section F4 (which may be also referred to a short range communication controller), an index data management section F5 (which may be also referred to an index data manager), a normal range specification section F6 (which may be also referred to as a normal range specifier), a self-terminal diagnosis test section F7 (which may be also referred to as a self-terminal diagnosis tester), a different-terminal diagnosis test section F8 (which may be also referred to as a different-terminal diagnosis tester), a wide area communication control section F9 (which may be also referred to as a wide area communication controller), a self-terminal anomaly notification section F10 (which may be also referred to as a self-terminal anomaly notifier), and a different-terminal anomaly notification section F11 (which may be also referred to as a different-terminal anomaly notifier). All or part of the functions performed by the controller 11 may be configured as one or more IC modules as hardware. The controller 11 is also referred to as a control system as well as the control circuit or the electronic control unit as explained above. The CPU 111 is also referred to as a central processing unit.

The system management section F1 manages communication with a device connected to the controller 11, recovers the controller 11, if subject to an error, from the error state, or adjusts data input/output. The system management section F1 manages the power supplied to the controller 11, corrects the system time, or manages an application or a process in progress. The system management section F1 corrects the system time based on a radio wave the GNSS receiver 14 receives from a GNSS satellite.

The storage 113 records a predetermined abnormal event, when occurred, as diagnostic information. The abnormal event to be recorded as diagnostic information signifies failed communication with a device to be connected to the controller 11 or unsuccessful connection to (or recognition of) a device that must be connected, for example. The storage 113 uses a fixed-size area to record the diagnostic information. The diagnostic information is deleted in order of time starting from the earliest one when the storage area is full.

The system information acquisition section F2 acquires system information about the self terminal. The system information includes the system time, the usage of the memory 112, the utilization of the CPU 111, the free space of the storage 113, the number of bad sectors, and the diagnostic information.

Figure 4:
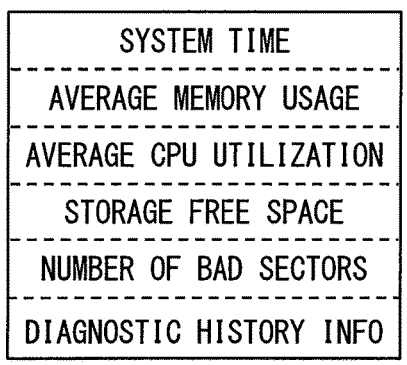
FIG. 4 is a diagram illustrating a schematic configuration of index data-item.

The index data generation section F3 generates an index data-item based on the system information acquired by the system information acquisition section F2. The index data-item includes an index value indicating states (such as an operational situation) of the controller 11 for the self terminal. As in FIG. 4, for example, index values of the index data-item include the current system time, the average memory usage, the average CPU utilization, the storage free space, the number of bad sectors, and the diagnostic history information.

The average memory usage provides an average value of the memory usage within a specified time period (e.g., several seconds) in the past from the current time point. The index data-item may include the most recent memory usage instead of the average memory usage. The index data-item may include the average memory usage and the most recent memory usage.

The average CPU utilization provides an average value of the CPU utilization within a specified time period in the past from the current time point. The index data-item may include the most recent CPU utilization instead of the average CPU utilization. The index data-item may include the average CPU utilization and the most recent CPU utilization.

The storage free space indicates the free space of the storage 113. The number of bad sectors indicates the number of sectors that cannot save data in the storage 113. The diagnostic history information provides diagnostic information within a specified time period (e.g., ten seconds to several minutes) from the current time point. The diagnostic history information indicates the frequency of a predetermined abnormal event occurred within a specified time period and the abnormal event type.

The above-mentioned contents of the index data-item are provided as an example and are not limited thereto. The index data-item may include a type of index value other than the above-mentioned. The index data-item need not include all the types of index values mentioned above. According to the exemplified mode, the index data-item includes several types of index values. However, the index data-item just needs to include at least one type of index values. The index data-item may include medians, dispersion, and standard deviations used in statistics instead of various average values. The index data-item may include version information about the software installed on the self terminal.

The index data-item generated by the index data generation section F3 is supplied with a time stamp indicating the generation time and is stored in the memory 112. The index data generation section F3, when generating the index data-item, supplies the generated index data-item to the short range communication control section F4.

The time when the index data generation section F3 generates the index data-item may be designed appropriately. For example, the index data-item may be generated every predetermined time. The index data-item may be generated when the short range communication control section F4 to be described starts communication with a roadside instrument. The index data-item may be generated when receiving a signal from the different in-vehicle unit 1 to request execution of a different-terminal diagnosis process to be described that assumes the in-vehicle unit 1 (or the corresponding host vehicle) to be a diagnosis target. The in-vehicle unit as a diagnosis target is also referred to as a target in-vehicle unit. The host vehicle as a diagnosis target is also referred to as a target nearby vehicle.

The short range communication control section F4 controls operation of the short range communicator 12 and acquires data received by the short range communicator 12. The short range communication control section F4 outputs data to the short range communicator 12 when the data needs to be transmitted to the other different in-vehicle unit 1 or the other roadside instrument. The short range communication control section F4 causes the short range communicator 12 to transmit the data. Namely, the short range communication control section F4 also functions as an interface to transmit or receive data from the other in-vehicle unit 1 or the other roadside instrument.

For example, the short range communication control section F4 may be supplied with an index data-item from the index data generation section F3. In such a case, the short range communication control section F4 generates transmission data including the index data-item and causes the short range communicator 12 to transmit the transmission data. The transmission data may be generated based on a data format used in the communication standard for the inter-vehicle communication. For example, the transmission data may include the index data-item supplied with a header that includes the terminal ID of the in-vehicle unit 1.

The short range communication control section F4 may acquire data including the index data-item transmitted by the other in-vehicle unit 1. In such a case, the short range communication control section F4 supplies the index data-item to the index data management section F5 in accordance with the terminal ID of the transmission source. The short range communication control section F4 is also referred to as a communication processing section, or a communication processor.

The index data management section F5 is supplied with the index data-item that is supplied from the short range communication control section F4 and is transmitted from the other in-vehicle unit 1. The index data management section F5 saves the index data-item in the memory 112 so as to correspond to each in-vehicle unit 1 as the transmission source. The index data-item corresponding to each in-vehicle unit 1 may be sorted in the order of reception and saved, for example. Past data saved over a predetermined time period may be successively discarded.

The normal range specification section F6 specifies a diagnosis criterion to diagnose the self terminal or a diagnosis criterion to diagnose the other in-vehicle unit 1. The diagnosis criterion specifies the normal range of each of predetermined diagnosis items. The normal range represents the upper limit and the lower limit of a range in which the diagnosis item is assumed to be normal. The normal range specification section F6 is also referred to as a determination criterion specification section or a determination criterion specifier.

As an example, the diagnosis items are assumed to correspond to items in the index data-item. Namely, the diagnosis items include the system time, the average memory usage, the average CPU utilization, the storage free space, the number of bad sectors, and abnormal event occurrence frequency. The abnormal event occurrence frequency is diagnosed based on the diagnostic history information. The diagnosis items are not limited to this example. Some items may be omitted from the diagnosis items.

The normal range specification section F6 specifies the above-mentioned diagnosis criterion based on the index data-item received from the nearby in-vehicle unit 1B. As a more favorable mode, the embodiment specifies a diagnosis criterion based on the index data-item received from the nearby in-vehicle unit 1B other than the in-vehicle unit 1 as a diagnosis target.

For example, the normal range specification section F6 specifies a diagnosis criterion to diagnose the self terminal based on the index data-item received from the nearby in-vehicle unit 1B. Any one of nearby in-vehicle units 1B (or the corresponding host vehicle) may be assumed to be a diagnosis target. In this case, the normal range specification section F6 specifies the diagnosis criterion based on the index data-item received from the nearby in-vehicle unit 1B other than the nearby in-vehicle unit 1B as a diagnosis target.

The index data-item for the self terminal may be used in addition to the index data-item received from the nearby in-vehicle unit 1B other than the nearby in-vehicle unit 1B used as a diagnosis target when any one of the nearby in-vehicle units 1B is used as a diagnosis target.

Operation of the normal range specification section F6 will be described later. In the description to follow, the diagnosis criterion to diagnose the self terminal is also referred to as a self-terminal diagnosis criterion. The diagnosis criterion to diagnose the other in-vehicle unit 1 is also referred to as a different-terminal diagnosis criterion. The self-terminal diagnosis criterion is also referred to as a self-unit determination criterion or a subject-unit determination criterion. The different-terminal diagnosis criterion is also referred to as a different-unit determination criterion.

The self-terminal diagnosis test section F7 compares the index data-item for the self terminal with the normal range for each diagnosis item indicated in the self-terminal diagnosis criterion specified by the normal range specification section F6 and thereby determines whether the controller 11 of the self terminal operates normally. The self-terminal diagnosis test section F7 will be described in detail later along with the description of a flowchart in FIG. 5. The self-terminal diagnosis test section is also referred to as a self-unit diagnosis test section or a subject-unit diagnosis test section or as a self-unit diagnosis tester or a subject-unit diagnosis tester.

The different-terminal diagnosis test section F8 compares the index data-item acquired from the nearby in-vehicle unit 1B as a diagnosis target with the normal range for each diagnosis item indicated in the different-terminal diagnosis criterion specified by the normal range specification section F6 and thereby determines whether a control section of the nearby in-vehicle unit 1B operates normally. The different-terminal diagnosis test section F8 will be described in detail later along with the description of a flowchart in FIG. 7. The different-terminal diagnosis test section F8 is also referred to as a different-unit diagnosis test section or a different-unit diagnosis tester.

The wide area communication control section F9 controls operation of the wide area communicator 13 and acquires data received by the wide area communicator 13. The wide area communication control section F9 outputs data to be transmitted to the center 3 to the wide area communicator 13 and causes the wide area communicator 13 to transmit the data.

The self-terminal anomaly notification section F10 requests the wide area communication control section F9 to transmit a self-terminal anomaly notification to the center 3. The self-terminal anomaly notification is a message indicating that the controller 11 of the self terminal does not operate normally when the self-terminal diagnosis test section F7 determines that the controller 11 of the self terminal does not operate normally. The wide area communication control section F9 transmits the self-terminal anomaly notification to the center 3 based on the request from the self-terminal anomaly notification section F10. The self-terminal anomaly notification just needs to include a terminal ID of the self terminal. As a more favorable mode, the self-terminal anomaly notification includes information about a reason (such as a diagnosis item) to diagnose the abnormal operation. The self-terminal anomaly notification section F10 is also referred to as a self-unit anomaly notification section or a subject-unit anomaly notification section or as a self-unit anomaly notifier or a subject-unit anomaly notifier.

The different-terminal diagnosis test section F8 may determine that the control section of the nearby in-vehicle unit 1B as a diagnosis target does not operate normally. In such a case, the different-terminal anomaly notification section F11 requests the wide area communication control section F9 to transmit a different-terminal anomaly notification to the center 3. The different-terminal anomaly notification is a message indicating that the control section of the nearby in-vehicle unit 1B does not operate normally. The wide area communication control section F9 transmits the different-terminal anomaly notification to the center 3 based on the request from the different-terminal anomaly notification section F11. The different-terminal anomaly notification just needs to include the terminal ID of the nearby in-vehicle unit 1B as a diagnosis target. As a more favorable mode, the different-terminal anomaly notification includes information about a reason to diagnose the abnormal operation. The different-terminal anomaly notification section F11 is also referred to as a different-unit anomaly notification section or a different-unit anomaly notifier.

(Center 3)

The center 3 connects to the wide area communication network 2. The center 3 can mutually communicate with each in-vehicle unit 1 in the in-vehicle unit diagnosis system 100 via the wide area communication network 2. The center 3 may include one server or several servers.

Suppose the center 3 receives the self-terminal anomaly notification from the in-vehicle unit 1. In such a case, the center 3 arranges for personnel to maintain the in-vehicle unit 1, for example. Suppose there is available data that previously associates the terminal ID of the in-vehicle unit 1 with contact information (e.g., e-mail address) about a user. In such a case, the center 3 may notify to the contact information that the in-vehicle unit 1 does not operate normally.

The above is similar to the different-terminal anomaly notification when received. The center 3 may arrange for personnel to maintain the abnormal in-vehicle unit 1. The center 3 may notify to a user of the in-vehicle unit 1 that an anomaly occurs on a sensor of the in-vehicle unit 1 in use.

(Self-Terminal Diagnosis Process)

By using a flowchart in FIG. 5, the description below explains a process (referred to as a self-terminal diagnosis process) performed by the controller 11 of the in-vehicle unit 1 to diagnose the self terminal. The description below assumes the in-vehicle unit 1A to be the subject of the process in order to distinguish between the in-vehicle unit 1 to perform the process and the other in-vehicle unit 1 for convenience sake.

It is noted that a flowchart or the processing of the flowchart in the present application includes sections (also referred to as steps), each of which is represented, for instance, as S10. Further, each section can be divided into several sub-sections while several sections can be combined into a single section. Furthermore, each of thus configured sections can be also referred to as a device, module, unit, or specific name (e.g., detector). Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

This flowchart may start at the moment the index data generation section F3 of the in-vehicle unit 1A generates an index data-item. Obviously, it may be favorable to appropriately design a condition to start the self-terminal diagnosis process. The self-terminal diagnosis process may start when an index data-item is acquired from the nearby in-vehicle unit 1B, for example. Moreover, the self-terminal diagnosis process may start when the index data generation section F3 generates an index data-item while the in-vehicle unit 1A performs inter-vehicle communication with larger than or equal to a specified number of the nearby in-vehicle units 1B. Furthermore, the self-terminal diagnosis process may start when the in-vehicle unit 1A starts vehicle roadside communication with an unshown roadside instrument.

At S10, the normal range specification section F6 performs the self-terminal diagnosis criterion specification process and proceeds to S11. The self-terminal diagnosis criterion specification process at S10 specifies the normal range for each predetermined diagnosis item, namely, the self-terminal diagnosis criterion, based on the index data-item received from the nearby in-vehicle unit 1B.

Figure 6:
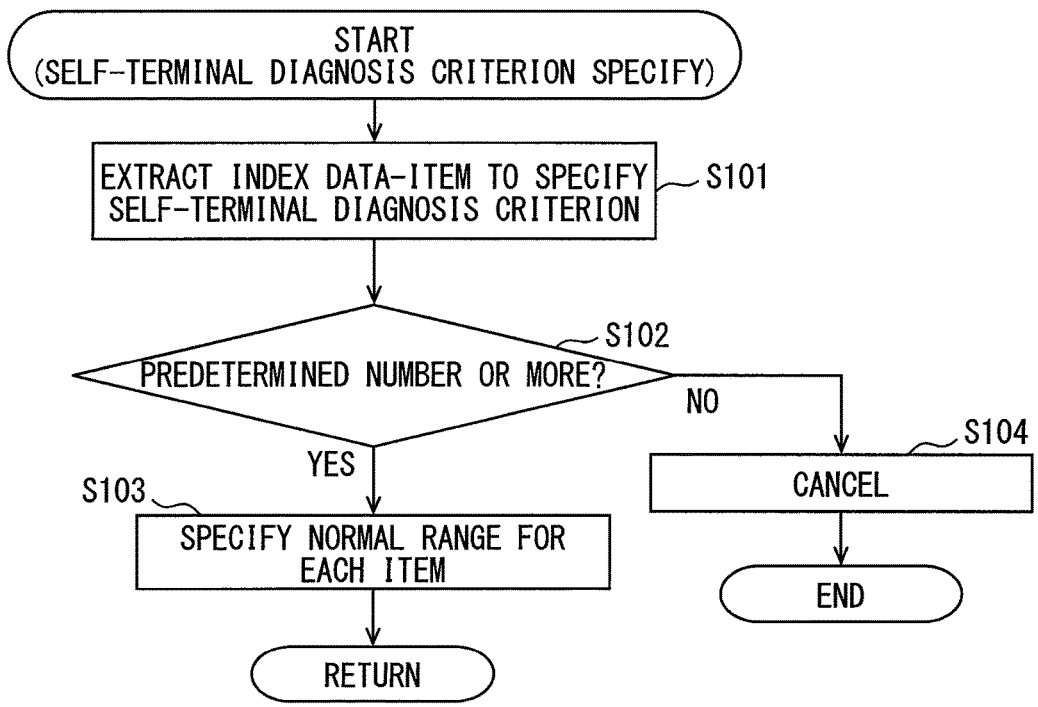
FIG. 6 is a flowchart illustrating a self-terminal diagnosis criterion specification process.

A flowchart in FIG. 6 illustrates a more specific example of the self-terminal diagnosis criterion specification process. At S101, an index data-item used as a population to generate the self-terminal diagnosis criterion is extracted from the index data-items that are received from the nearby in-vehicle unit 1B and are stored in the memory 112. The process then proceeds to S102.

As an example, an index data-item is received from the nearby in-vehicle unit 1B within a specified time in the past from the time point when the index data generation section F3 generates an index data-item. The received index data-item is extracted as a population to specify the self-terminal diagnosis criterion.

The specified time here is favorably set to be relatively short such as a cycle to transmit the index data-item or several seconds to several tens of seconds from the viewpoint of diagnostic accuracy. This is because the in-vehicle unit diagnosis system 100 diagnoses the controller 11 of the in-vehicle unit 1 based on the assumption that the state of the controller 11 of the specific in-vehicle unit 1 (the self terminal in this example) is highly likely to be similar to the state of the controller 11 of the nearby in-vehicle unit 1.

The specific description is as follows. The state of the controller 11 such as the utilization of the CPU 111 or the usage of the memory 112 depends on an application or a process performed by the CPU 111. More specifically, the number of events to be processed increases in accordance with an increase in the number of in-vehicle units 1B with which the self terminal performs inter-vehicle communication. The number of data-items to be temporarily stored increases to increase the utilization of the CPU 111 or the usage of the memory 112.

Supposing that the self terminal communicates with the service provision terminal to use a service, the utilization of the CPU 111 or the usage of the memory 112 is affected by an application performed to use the service. The CPU 111 performs an application or a process to use services provided by the service provision terminal. The application or the process is supposed to depend on the type of a service to be used.

However, several in-vehicle units 1 may communicate with the same service provision terminal. This signifies that the in-vehicle units 1 are highly likely to share the application or the process that is performed on the in-vehicle units 1. The in-vehicle units 1 indicate the highly similar CPU utilization or memory usage when the same application or process is performed on the in-vehicle units 1.

The nearby in-vehicle unit 1B corresponds to the in-vehicle unit 1 that exists within a range capable of inter-vehicle communication with the self terminal. The number of in-vehicle units 1 with which the self terminal performs inter-vehicle communication is highly likely to be similar to the number of in-vehicle units 1 with which the nearby in-vehicle unit 1B performs inter-vehicle communication. The self terminal may communicate with the service provision terminal to use a service. In this case, the nearby in-vehicle unit 1B is also expected to communicate with the same service provision terminal to use a service.

The state of the controller 11 of the self terminal is highly likely to be similar to the state of the nearby in-vehicle unit 1B when the controller 11 of the self terminal operates normally. In other words, the controller 11 of the self terminal may be supposed to be unlikely to operate normally when the state of the controller 11 of the self terminal is not similar to the state of the nearby in-vehicle unit 1B. It is therefore possible to determine whether the controller 11 of the self terminal operates normally by comparing the state of the controller 11 of the self terminal with the state of the nearby in-vehicle unit 1B.

However, the state of the controller 11 in each terminal varies momentarily. The index data-item may be received at the time after a specified time or longer elapsed from the time to generate an index data-item for the diagnosis target and the in-vehicle unit 1 and is therefore highly likely to be inappropriately used to determine whether the controller 11 of the self terminal operates normally.

Therefore, the specified time is favorably as short as possible when the specified time is used as a condition to select an index data-item as a population from index data-items stored in the memory 112 to determine the self-terminal diagnosis criterion. Obviously, excessively shortening the specified time decreases the number of index data-items to be extracted as a population. The time to adopt the population may be appropriately specified in consideration of the above-mentioned trade-off.

The most recently received index data-item is adopted if a plurality of index data-items are received from the same in-vehicle unit 1 within the specified time. This example assumes an index data-item to be adopted as a population to determine the self-terminal diagnosis criterion on condition that the index data-item is received within a specified time in the past elapsed from the time point when the index data generation section F3 generated an index data-item. However, the population is not limited thereto. The population to be adopted may be equal to an index data-item received until a population adoption time elapses from the time point when the index data generation section F3 generated an index data-item. Alternatively, the population to be adopted may be equal to an index data-item received within the population adoption time before and after the time point when the index data generation section F3 generated an index data-item.

At S102, it is determined whether the number of index data-items extracted at S101 is greater than or equal to a predetermined number. The predetermined number here is assumed to be large enough to settle a fully reliable diagnosis criterion. For example, suppose the diagnosis criterion is specified based on a small number of index data-items and the index data-items include an index data-item from the in-vehicle unit that does not operate normally. In such a case, the diagnosis criterion to be specified is also relatively strongly affected and may result in an inappropriate criterion.

Therefore, the diagnosis criterion is favorably specified based on at least the number of index data-items capable of setting a fully reliable diagnosis criterion. The number of index data-items capable of setting a fully reliable diagnosis criterion may be appropriately designed and is set to 5 here. As another mode, the predetermined number may be set to 1.

The process proceeds to S103 if the number of extracted index data-items is greater than or equal to the predetermined number. The process proceeds to S104 if the number of extracted index data-items is smaller than the predetermined number.

At S103, a normal range is specified for each diagnosis item based on the several index data-items extracted at S101. A representative value is calculated for each item in the index data-item based on the several index data-items extracted at S101. The several index data-items are received from the different nearby in-vehicle units 1B. Obviously, even values for the same item are expected to differ (vary) depending on each index data-item. The representative value for a given item representatively indicates a value of the item in each of several index data-items.

The representative value for a given item may be an average value or a median that is used in statistics and is found as a population corresponding to the value of the item in each of the several index data-items. The representative value may be found by adding a standard deviation to an average value or adding a double the standard deviation to an average value. Any representative value for each item may be designed appropriately. As an example, the representative value here is assumed to be an average value that causes any item to be settled as a population by using the value of the item in each index data-item.

A lower limit of the normal range for each item is found by subtracting double the standard deviation from an average value of the item. An upper limit thereof is found by adding double the standard deviation to an average value of the item. Obviously, the method of specifying the normal range for each item is not limited to the above and may be designed appropriately.

For example, the upper limit of the normal range for a given item may be found by adding a predetermined value to the representative value for the item. The lower limit thereof may be found by subtracting a predetermined value from the representative value for the item. One of the upper limit and the lower limit of the normal range for a given item may be set to a fixed value instead of the representative value.

The upper limit of the normal rage for a given item may be found by multiplying the representative value for the item by a predetermined upper-limit coefficient. The lower limit thereof may be found by multiplying the representative value for the item by a predetermined lower-limit coefficient. The upper-limit coefficient and the lower-limit coefficient may be designed appropriately so that the upper-limit coefficient is larger than or equal to 1 and the lower-limit coefficient is smaller than 1. For example, supposing that the upper-limit coefficient for a given item is set to 1.3 and the lower-limit coefficient is set to 0.7, the normal range for the item then results in ±30% of the representative value.

Control returns to the self-terminal diagnosis process (FIG. 5) as a calling process after the normal range (i.e., the self-terminal diagnosis criterion) is specified for each diagnosis item as above. The process then proceeds to S11.

At S104, the self-terminal diagnosis criterion specification process and the self-terminal diagnosis process as a calling process of this flowchart are terminated.

Figure 5:
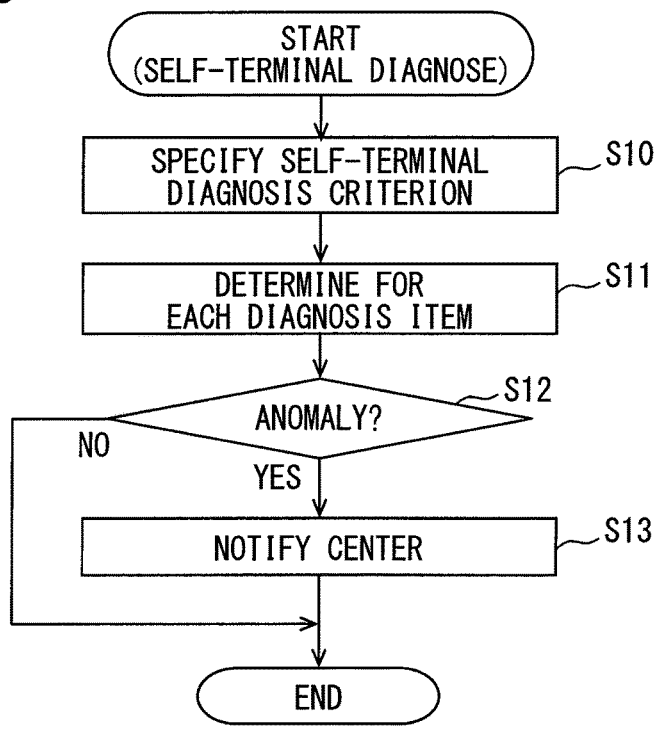
FIG. 5 is a flowchart illustrating a self-terminal diagnosis process the controller performs.

At S11 in FIG. 5, the self-terminal diagnosis test section F7 determines whether the value of each item in index data-item (namely, of the self terminal) generated by the index data generation section F3 falls within the normal range for each diagnosis item specified at S10.

For example, the self-terminal diagnosis test section F7 determines whether the system time for the self terminal falls within the normal range specified by the normal range specification section F6 in terms of the system time. The self-terminal diagnosis test section F7 determines whether the average memory usage of the self terminal falls within the normal range specified for the average memory usage. The self-terminal diagnosis test section F7 compares the normal range with information about the self terminal concerning the other items and determines whether the information falls within the normal range.

Various normal ranges are specified based on the index data-item for the in-vehicle unit 1B existing around the self terminal. Determining whether the value of an item (e.g., average memory usage) for the self terminal falls within the normal range specified for the item is comparable to determining whether the value of the item in the self terminal is equal to the value for the nearby in-vehicle unit 1B. For example, determining whether the system time for the self terminal falls within the normal range specified for the system time is comparable to determining whether a difference between the system time for the self terminal and the system time for the nearby in-vehicle unit 1B falls within a predetermined allowable range.

The value of an item for the self terminal may not fall within the normal range specified for the item. This signifies that the self terminal behaves differently from the nearby in-vehicle unit 1B in terms of that item. The fact that the self terminal behaves differently from the nearby in-vehicle unit 1B suggests a possibility of a defect occurring in the self terminal.

The process proceeds to S12 after completing the determination at S11 whether the value of each of all items in the index data-item generated by the index data generation section F3 falls within a range defined by the corresponding normal range.

At S12, it is determined whether the controller 11 of the self terminal operates normally as a result of the determination at S11. A condition (anomaly determination condition) to determine the normal operation may be specified appropriately. For example, the controller 11 of the self terminal may be determined not to operate normally if at least one of several diagnosis items is out of the normal range. Alternatively, the controller 11 of the self terminal may be determined not to operate normally if at least the predetermined number of items (e.g., three items) is out of the normal range.

As an example here, it is determined that the controller 11 does not operate normally if at least one of the diagnosis items is out of the normal range. The description below concisely explains the reason for determining that the controller 11 does not operate normally if each diagnosis item is out of the normal range.

For example, the system time for the self terminal may be out of the normal range specified for the system time. This signifies that the system time for the self terminal greatly differs from the system time for the nearby in-vehicle unit 1B. The fact that the system time for the self terminal differs from the system time for the nearby in-vehicle unit 1B signifies that the self terminal does not acquire data (i.e., a signal from the GNSS satellite) to correct the system time.

There may be a possible defect occurring on a physical communication interface with the GNSS receiver 14 or on a device driver to control the GNSS receiver 14. Therefore, the controller 11 of the self terminal can be determined not to operate normally if the system time for the self terminal is out of the normal range.

Obviously, the above-mentioned defect does not always occur only because the system time for the self terminal differs from the others in the vicinity. For example, the self terminal may exist in such an environment as a tunnel or a multistory parking lot where no radio wave reaches from the GNSS satellite. In such a case, the self terminal cannot acquire a signal from the GNSS satellite and the system time is incorrect. A mode to prevent this incorrect determination will be described later in a modification.

The average memory usage for the self terminal may be out of the normal range, namely, may greatly differ from the average memory usage for the nearby in-vehicle unit 1B. In such a case, only the self terminal may enter a situation where a necessary application fails to start, an inappropriate application is running, or the memory 112 is released unsuccessfully. Therefore, the controller 11 of the self terminal can be determined not to operate normally when the average memory usage of the self terminal is out of the normal range.

The controller 11 of the self terminal can also be determined not to operate normally when the average CPU utilization is out of the normal range for the same reason as that for the case where the average memory usage is out of the normal range.

The same software is installed on each in-vehicle unit 1. The storage 113 is therefore supposed to use the same size to store program data. The storage 113 itself uses the same storage capacity. The in-vehicle units 1 are therefore supposed to use the equal storage free space.

Suppose the storage free space is out of the normal range. This suggests the possibility that the storage 113 of the self terminal might save a program not to be saved originally. The controller 11 can be therefore determined not to operate normally when the storage free space is out of the normal range. The index data-item here is assumed to include the storage free space. The index data-item may include the usage of the storage 113.

The storage 113 may be subject to an initial failure when the number of bad sectors is out of the normal range. The controller 11 can therefore be determined not to operate normally when the number of bad sectors is out of the normal range.

The diagnostic history information can also represent a predetermined abnormal event occurrence frequency within a specified time. The normal range specification section F6 specifies a normal range from the diagnostic history information. This normal range corresponds to an allowable range of abnormal event occurrence frequencies per specified time. As above, the abnormal event here signifies an observable event such as a communication error due to a device to be connected to the controller 11 and belongs to a predetermined type.

The abnormal event occurrence frequency within the specified time is estimated to be greater than that for the controller 11 of the nearby in-vehicle unit 1B when the controller 11 of the self terminal does not operate normally. The controller 11 of the self terminal can be therefore determined not to operate normally when the abnormal event occurrence frequency indicated in the diagnostic history information about the self terminal is out of the normal range.

An abnormal event may occur frequently depending on an outside environment where the in-vehicle unit 1 is placed, for example, even though the controller 11 operates normally. For example, suppose an abnormal event defines that the GNSS receiver 14 cannot receive a GNSS radio wave. The diagnostic information is recorded to notify that no GNSS radio wave is received while the vehicle is traveling through a tunnel.

However, it is a normal operation to record several diagnostic informations indicating unsuccessful reception of a GNSS radio wave when the self terminal exists in an environment such as a tunnel where GNSS radio waves cannot be received. Therefore, an influence of the outside environment may cause incorrect determination in the mode that determines whether the controller 11 operates normally based on whether the abnormal event occurrence frequency is greater than or equal to a predetermined threshold value.

Suppose the self terminal exits in an environment that disables reception of GNSS waves. In such a case, the nearby in-vehicle unit 1B is also highly likely to exist in an environment that disables reception of GNSS waves. Like the self terminal, the nearby in-vehicle unit 1B also records the diagnostic information indicating unsuccessful reception of GNSS waves. Thus, an influence from the outside environment reflects on the normal range configured based on the diagnostic history information acquired from the nearby in-vehicle unit 1B.

The mode of the embodiment can therefore reduce a possibility of determining the operation not to be normal though the operation is normal.

The determination at S12 may result in that the anomaly determination condition is satisfied. In this case, S12 goes to YES and the process proceeds to S13. The determination at S12 may result in that the anomaly determination condition is not satisfied. In this case, S12 goes to NO and the process flow terminates.

At S13, the self-terminal anomaly notification section F10 requests the wide area communication control section F9 to transmit a self-terminal anomaly notification to the center 3. The wide area communication control section F9 transmits the self-terminal anomaly notification to the center 3 based on the request from the self-terminal anomaly notification section F10. The process flow then terminates.

(Different-Terminal Diagnosis Process)

Figure 7:
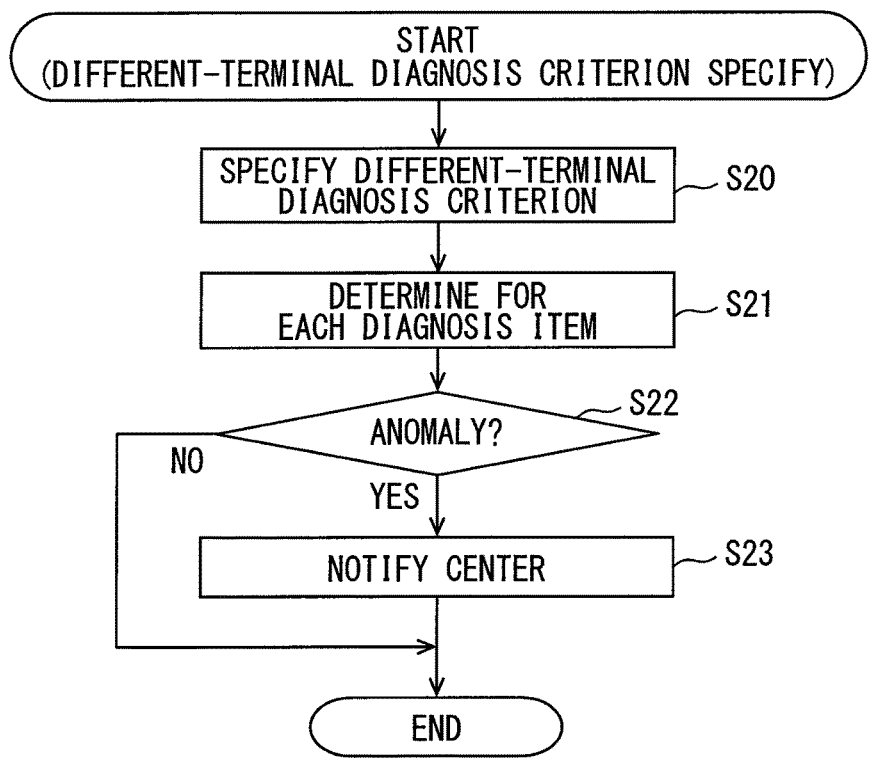
FIG. 7 is a flowchart illustrating a different-terminal diagnosis process the controller performs.

With reference to a flowchart in FIG. 7, the description below explains a process (referred to as a different-terminal diagnosis process) performed by the controller 11 to diagnose any nearby in-vehicle unit 1B. This flowchart may start at the moment the index data-item is acquired from any nearby in-vehicle unit 1B. Obviously, it may be favorable to appropriately design a condition to start the different-terminal diagnosis process, which may start when the index data generation section F3 generates an index data-item, for example.

The different-terminal diagnosis process may start when one of the nearby in-vehicle units 1B issues a request to perform the different-terminal diagnosis process that uses the nearby in-vehicle unit 1B itself as a diagnosis target. Moreover, the different-terminal diagnosis process may start when the vehicle roadside communication with an unshown roadside instrument starts.

Figure 8:
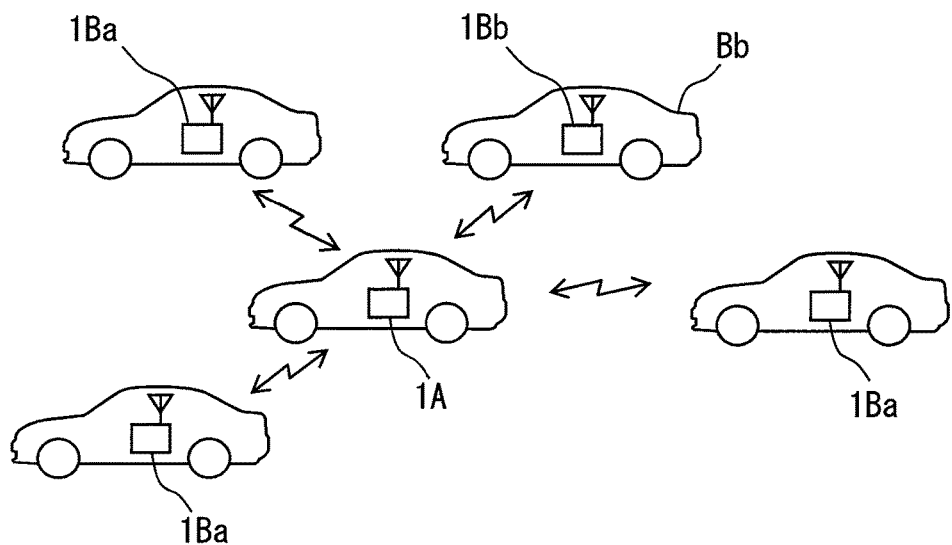
FIG. 8 is a diagram illustrating operation of the different-terminal diagnosis process.

For convenience sake, the description to follow assumes the nearby in-vehicle unit 1B as a diagnosis target to be a diagnosis target unit 1Bb (also referred to as a target nearby in-vehicle unit) and assumes the nearby in-vehicle unit 1B other than the diagnosis target unit 1Bb to be a nearby in-vehicle unit 1Ba (see FIG. 8). The nearby vehicle B as the host vehicle to mount the diagnosis target unit 1Bb may also be referred to as a target nearby vehicle. As mentioned in the opening sentence, the in-vehicle unit 1A in FIG. 8 is the in-vehicle unit 1 corresponding to the self terminal. The in-vehicle unit 1A performs the different-terminal diagnosis process.

At S20, the normal range specification section F6 performs a different-terminal diagnosis criterion specification process and proceeds to S21. The different-terminal diagnosis criterion specification process at S20 specifies the normal range for each diagnosis item based on the index data-item received from the nearby in-vehicle unit 1Ba.

The different-terminal diagnosis criterion specification process is equal to the above-mentioned self-terminal diagnosis criterion specification process except a difference in the index data-item as a population to specify the diagnosis criterion. More specifically, the above-mentioned self-terminal diagnosis criterion specification process specifies the diagnosis criterion by using the index data-item that is acquired from the nearby in-vehicle unit 1B and satisfies a predetermined condition.

The different-terminal diagnosis criterion specification process specifies the diagnosis criterion by using the index data-item that is acquired from the nearby in-vehicle unit 1Ba (namely, the in-vehicle unit 1 other than the diagnosis target unit 1Bb) and satisfies a predetermined condition. An index data-item may be received from the nearby in-vehicle unit 1Ba within a specified time in the past from the time point to receive an index data-item from the diagnosis target unit 1Bb. The different-terminal diagnosis criterion specification process uses the index data-item received from the nearby in-vehicle unit 1Ba as a population. An index data-item for the self terminal may be generated within a specified time in the past from the time point to receive an index data-item from the diagnosis target unit 1Bb. The different-terminal diagnosis criterion specification process also uses the generated index data-item as a population.

The different-terminal diagnosis criterion is equal to the self-terminal diagnosis criterion specification process except the above-mentioned difference and a detailed description about the process is omitted.

The mode according to the embodiment does not use the index data-item acquired from the diagnosis target unit 1Bb as a population to specify the different-terminal diagnosis criterion. However, the mode is not limited thereto. As another mode, the normal range specification section F6 may specify the different-terminal diagnosis criterion by using an index data-item acquired from the diagnosis target unit 1Bb.

At S21, the different-terminal diagnosis test section F8 determines whether a value of each item in the index data-item received from the diagnosis target unit 1Bb falls within the normal range for each diagnosis item specified as the different-terminal diagnosis criterion at S20.

For example, the different-terminal diagnosis test section F8 determines whether the system time for the diagnosis target unit 1Bb falls within the normal range specified by the normal range specification section F6 for the system time. The different-terminal diagnosis test section F8 similarly processes the other items such as the average memory usage, the average CPU utilization, and the storage free space by comparing the normal range corresponding to the item with the self terminal information about the item and determining whether the item falls within the normal range.

Various normal ranges are specified based on the index data-item for the nearby in-vehicle unit 1Ba or the self terminal. Therefore, determining whether the value of an item (e.g., average memory usage) in the diagnosis target unit 1Bb falls within the normal range specified for the item is comparable to determining whether the value of the item in the diagnosis target unit 1Bb is equal to the value for the nearby in-vehicle unit 1Ba or the self terminal.

The fact that the value of an item in the diagnosis target unit 1Bb does not fall within the normal range specified for the item signifies that the diagnosis target unit 1Bb behaves differently from the nearby in-vehicle unit 1Ba or the self terminal in terms of the item. The fact that the diagnosis target unit 1Bb behaves differently from the nearby in-vehicle unit 1Ba or the self terminal suggests a possibility of a defect occurring in the diagnosis target unit 1Bb.

The process proceeds to S22 after completing the determination at S21 whether the value of each of all items in the index data-item acquired from the diagnosis target unit 1Bb falls within a range defined by the corresponding normal range.

At S22, the different-terminal diagnosis test section F8 determines whether the controller of the diagnosis target unit 1Bb operates normally as a result of the determination at S21. A condition (namely, an anomaly determination condition) to determine whether the controller of the diagnosis target unit 1Bb operates normally may be appropriately specified similarly to the above-mentioned self-terminal diagnosis process.

When it is determined at S22 that the anomaly determination condition is satisfied, S22 goes to YES and the process proceeds to S23. When it is determined at S22 that the anomaly determination condition is not satisfied, S22 goes to NO and the process flow terminates.

At S23, the different-terminal anomaly notification section F11 requests the wide area communication control section F9 to transmit a different-terminal anomaly notification to the center 3. The wide area communication control section F9 transmits the different-terminal anomaly notification to the center 3 based on the request from the different-terminal anomaly notification section F11. The process flow then terminates.

In the above-mentioned mode, the normal range specification section F6 specifies a different-terminal diagnosis criterion by using the index data-item for the self terminal in addition to the index data-item acquired from the nearby in-vehicle unit 1Ba. The mode is not limited thereto. The mode may specify a different-terminal diagnosis criterion based on the index data-item for the nearby in-vehicle unit 1Ba without using the index data-item for the self terminal.

(Embodiment Overview)

The above-mentioned configuration determines whether the controller 11 of the in-vehicle unit 1 as a diagnosis target operates normally, by comparing an index value indicating the state of the controller 11 of the in-vehicle unit 1 as a diagnosis target with a diagnosis criterion specified based on an index value indicating the state of the controller 11 of the nearby in-vehicle unit 1B except the diagnosis target.

More specifically, the normal range specification section F6 specifies a normal range for each index value (S10) based on the index value indicating the state of the controller 11 of the nearby in-vehicle unit 1B when the controller 11 of the self terminal is diagnosed. The self-terminal diagnosis test section F7 determines whether the index value indicating the state of the controller 11 of the self terminal falls within the normal range.

The controller 11 of the self terminal is determined not to operate normally (S12) if the number or type of index values out of the normal range satisfies a predetermined anomaly determination condition. The self-terminal anomaly notification section F10 notifies the center 3, if applicable, that the self-terminal diagnosis test section F7 determines that the controller 11 of the self terminal does not operate normally.

Several nearby in-vehicle units 1B supply an index data-item as a source to generate the normal range for each index value to diagnose the self terminal, namely, the self-terminal diagnosis criterion. Each of the nearby in-vehicle units 1B exists within a range capable of inter-vehicle communication with the self terminal, namely, within a relatively small range.

Each of the nearby in-vehicle units 1B exists within a relatively small range. Therefore, the number of in-vehicle units 1 with which the self terminal performs inter-vehicle communication is highly likely to be similar to the number of in-vehicle units 1 with which each of the nearby in-vehicle units 1B performs inter-vehicle communication. Supposing the self terminal communicates with the service provision terminal to use a service, the nearby in-vehicle unit 1B is also expected to communicate with the same service provision terminal to use a service.

Namely, the self terminal and the nearby in-vehicle unit 1B are highly likely to have the software (e.g., an application program to use services) performed by the controller 11 (particularly the CPU 111) or a load (the number of tasks to be processed) on the CPU 111 in common. The CPU utilization or the memory usage is highly likely to be similar in the in-vehicle units 1 when the self terminal and the nearby in-vehicle unit 1B perform the same software.

Any of the nearby in-vehicle units 1B is relatively less likely not to operate normally. Therefore, the self-terminal diagnosis criterion specified based on the index data-item acquired from the nearby in-vehicle unit 1B indicates a range capable of assuming that the controller 11 operates normally in the current situation.

Essentially, the state of the controller 11 of the self terminal is highly likely to be similar to the state of the controller 11 of the nearby in-vehicle unit 1B when the self terminal operates normally. The index data-item for the self terminal is supposed to be similar to the index data-item acquired from the nearby in-vehicle unit 1B. A value of each item in the index data-item for the controller 11 of the self terminal is supposed to fall within the normal range corresponding to the item. In other words, a value of each item in the index data-item for the controller 11 of the self terminal, if the value being out of the normal range corresponding to the item, suggests a possibility that the controller 11 of the self terminal does not operate normally.

It is possible to more accurately determine whether the controller 11 of the self terminal operates normally, by comparing the index data-item for the self terminal with the self-terminal diagnosis criterion specified based on the index data-item acquired from the nearby in-vehicle unit 1B.

Any of the nearby in-vehicle units 1B may be selected as a diagnosis target. In this case, the normal range specification section F6 specifies a normal range for each index value (S20) based on an index value indicating the state of the controller 11 of the nearby in-vehicle unit 1Ba except the diagnosis target unit 1Bb. The different-terminal diagnosis test section F8 determines whether the index value indicating the state of the controller 11 of the diagnosis target unit 1Bb falls within the normal range.

The controller 11 of the diagnosis target unit 1Bb is determined not to operate normally (S22) if the number or type of index values out of the normal range satisfies the predetermined anomaly determination condition. The different-terminal anomaly notification section F11 notifies the center 3, if applicable, that the different-terminal diagnosis test section F8 determines that the controller 11 of the diagnosis target unit 1Bb does not operate normally.

The diagnosis target unit 1Bb and the nearby in-vehicle unit 1Ba are in-vehicle units 1 existing in a range, a relatively small range, capable of inter-vehicle communication with the self terminal. According to an operation similar to the diagnosis of the self terminal, the different-terminal diagnosis criterion specified by the normal range specification section F6 indicates the range capable of assuming that the controller 11 operates normally in the current situation.

The different-terminal diagnosis test section F8 can more accurately determine whether the controller 11 of the diagnosis target unit 1Bb operates normally, by comparing the different-terminal diagnosis criterion with the index data-item acquired from the diagnosis target unit 1Bb.

While there has been described the embodiment of the present disclosure, the disclosure is not limited to the above-mentioned embodiment. Embodiments described below are also included in the technical scope of the disclosure. Furthermore, the disclosure may be embodied in various modifications without departing from the spirit and scope of the disclosure.

<First Modification>

The above-mentioned embodiment has described the configuration in which the in-vehicle unit 1 includes the different-terminal diagnosis test section F8 and the different-terminal anomaly notification section F11. However, the embodiment is not limited thereto. For example, the in-vehicle unit 1 may not include the different-terminal diagnosis test section F8 or the different-terminal anomaly notification section F11.

<Second Modification>

The above-mentioned embodiment has described the configuration in which the in-vehicle unit 1 includes the self-terminal diagnosis test section F7 and the self-terminal anomaly notification section F10. However, the embodiment is not limited thereto. For example, the in-vehicle unit 1 may not include the self-terminal diagnosis test section F7 or the self-terminal anomaly notification section F10.

The configuration not including the self-terminal anomaly notification section F10 and the different-terminal anomaly notification section F11 may not also include the wide area communicator 13 and the wide area communication control section F9.

<Third Modification>

As above, the in-vehicle units 1 in the in-vehicle unit diagnosis system 100 each have the same function, but not limited thereto. The in-vehicle unit 1 to be diagnosed and the diagnosing in-vehicle unit 1 include different functions. The in-vehicle unit 1 having only a function to be diagnosed may exist in the in-vehicle units 1 in the in-vehicle unit diagnosis system 100.

The in-vehicle unit 1 to be diagnosed just needs to include at least the system information acquisition section F2, the index data generation section F3, and the short range communication control section F4 having a function to transmit an index data-item for the self terminal.

The diagnosing in-vehicle unit 1 just needs to include at least the short range communication control section F4 having a function to acquire an index data-item transmitted from the in-vehicle unit 1 to be diagnosed, the index data management section F5, the normal range specification section F6, and the different-terminal diagnosis test section F8.

According to the above-mentioned configuration, the diagnosing in-vehicle unit 1 can diagnose the in-vehicle unit 1 to be diagnosed but cannot itself or have itself diagnosed. The diagnosing in-vehicle unit 1 therefore favorably includes the system information acquisition section F2 and the index data generation section F3 in addition to the above-mentioned minimal configuration. The short range communication control section F4 favorably has a function to transmit an index data-item for the self terminal.

The in-vehicle unit 1 can transmit its index data-item to the other diagnosing in-vehicle unit 1 and have itself diagnosed even though the self-terminal diagnosis test section F7 is not included. Therefore, the self-terminal diagnosis test section F7 may not be included. Namely, the self-terminal diagnosis test section F7 is an optional element.

<Fourth Modification>

There has been described the mode that determines whether the controller 11 of the self terminal operates normally, based on whether the system time for the self terminal differs from the system time for the nearby in-vehicle unit 1B.

However, no signal can be acquired from the GNSS satellite when the self terminal exists in a tunnel or a multistory parking lot, namely, an environment where no radio wave reaches from the GNSS satellite. In such a case, the system time is incorrect.

It is therefore favorable to consider a situation for the GNSS receiver 14 to receive signals from the GNSS satellite or an environment where the self terminal exists when determining whether the controller 11 operates normally, based on a difference between the system times.

The configuration may not perform determination based on the system time when the GNSS receiver 14 cannot receive signals from the GNSS satellite, for example. The GNSS receiver 14 may be configured to successively output information about a situation (e.g., the number of seized satellites) of receiving signals from the GNSS satellite to the controller 11 in order to determine whether the GNSS receiver 14 can receive signals from the GNSS satellite.

There has been described the mode in which the self-terminal diagnosis test section F7 determines whether the controller 11 of the self terminal operates normally, based on a difference between the system times. The same applies to the different-terminal diagnosis test section F8. Namely, the mode can be configured not to perform determination based on the system time when the diagnostic history information about an index data-item acquired from the diagnosis target unit 1Bb indicates that the GNSS receiver 14 cannot acquire a signal from the GNSS satellite.

<Fifth Modification>

The self-terminal diagnosis test section F7 may determine that the self terminal does not operate normally. The self-terminal anomaly notification section F10 may then generate a self-terminal anomaly notification including position information output from the GNSS receiver 14 at the time point and cause the wide area communication control section F9 to transmit the self-terminal anomaly notification to the center 3.

According to this mode, the center 3 can comprehend a point corresponding to the in-vehicle unit 1 not operating normally or a point that disables the controller 11 of the in-vehicle unit 1 from operating normally. This can easily analyze a point that disables the in-vehicle unit 1 from operating normally.

The self-terminal anomaly notification may indicate a location such as a multistory parking lot where a signal from the GNSS satellite hardly reaches. In addition, the controller 11 of the self terminal may be determined not to operate normally because of a difference between the system times. In such a case, the mode may be configured so that the center 3 does not arrange for maintenance in response to the self-terminal anomaly notification. This is because the system time is supposed to be incorrect at a location where a signal from the GNSS satellite hardly reaches even though the controller 11 is normal.

<Sixth Modification>

The different-terminal diagnosis test section F8 may determine that the diagnosis target unit 1Bb does not operate normally. In such a case, the mode may be configured so that the different-terminal anomaly notification section F11 generates a different-terminal anomaly notification including the position information output from the GNSS receiver 14 at the time point. In this case, the wide area communication control section F9 transmits a different-terminal anomaly notification including the position information to the center 3.

In this mode, similarly to the fifth modification, the center 3 can comprehend a point corresponding to the in-vehicle unit 1 not operating normally or a point that disables the controller 11 of the in-vehicle unit 1 from operating normally. This can easily analyze a point that disables the in-vehicle unit 1 from operating normally.

The different-terminal anomaly notification may indicate a location where a signal from the GNSS satellite hardly reaches. In addition, the controller 11 may be determined not to operate normally because of a difference between the system times. In such a case, the mode may be configured not to arrange for maintenance in response to the different-terminal anomaly notification.

<Seventh Modification>

A new version of the software used in the in-vehicle unit 1 is made public as needed. The version of the software used in each of the in-vehicle units 1 is assumed to be accordingly upgraded as needed. However, all the in-vehicle units 1 do not simultaneously update the software. As a result, the in-vehicle unit 1 using an earlier version of software is assumed to coexist with the in-vehicle unit 1 using a new version of software.

Obviously, an earlier version of software and a new version of software are assumed to differ from each other in the data size of the storage 113, the CPU utilization, or the memory usage.

Therefore, there is highly likely to be a difference in states between the controller 11 of the in-vehicle unit 1 using an earlier version of software and the controller 11 of the in-vehicle unit 1 using a new version of software. The determination may be incorrect if a diagnosis criterion to diagnose the controller 11 of the in-vehicle unit 1 using an earlier version of software is generated based on the index data-item acquired from the in-vehicle unit 1 using a new version of software.

The normal range specification section F6 favorably specify a diagnosis criterion based on the index data-item acquired from the in-vehicle unit 1 using the software whose version is equal to that of the software the in-vehicle unit 1 as a diagnosis target uses.

This modification may be configured as follows. The short range communication control section F4 of the in-vehicle unit 1 transmits transmission data to the nearby in-vehicle unit 1B. The transmission data includes the corresponding index data-item supplied with a header including a terminal ID and version information about the currently used software. The short range communication control section F4 acquires data including the index data-item transmitted from the nearby in-vehicle unit 1B and supplies the data to the index data management section F5 by allowing the index data-item, the terminal ID, and the software version information to correspond to each other. The index data management section F5 saves the index data-item for each in-vehicle unit 1 in the memory 112 by allowing the index data-item to correspond to the version information about the software the in-vehicle unit 1 uses.

The normal range specification section F6 specifies a diagnosis criterion based on the index data-item acquired from the in-vehicle unit 1 that uses the software whose version is equal to that of the software the in-vehicle unit 1 as a diagnosis target uses.

Specifically, the normal range specification section F6 specifies a self-terminal diagnosis criterion based on the index data-item acquired from the nearby in-vehicle unit 1B that uses the software whose version is equal to that of the software the self terminal uses. Obviously, a time-related condition may be used as a condition to select an index data-item to specify the self-terminal diagnosis criterion similarly to the above-mentioned embodiment.

The normal range specification section F6 specifies a different-terminal diagnosis criterion based on the index data-item acquired from the nearby in-vehicle unit 1Ba that uses the software whose version is equal to that of the software the diagnosis target unit 1Bb uses. Obviously, a time-related condition may be used as a condition to select an index data-item to specify the different-terminal diagnosis criterion similarly to the above-mentioned embodiment. The index data-item for the self terminal may be used to specify a different-terminal diagnosis criterion when the version of the software the self terminal uses is equal to the version of the software the diagnosis target unit 1Bb uses.

According to the mode, the version information about the currently used software as well as the terminal ID is supplied outside the index data-item (e.g., the header of the transmission data) and is transmitted, but not limited thereto. For example, the software version information may be included in the index data-item. The receiving in-vehicle unit 1 just needs to specify the version information about the software the transmitting in-vehicle unit 1 currently uses.

<Eighth Modification>

There has been described the configuration in which the self-terminal anomaly notification section F10 or the different-terminal anomaly notification section F11 uses wide area communication to notify the center 3 that the self terminal or the nearby in-vehicle unit 1B as a diagnosis target does not operate normally, but not limited thereto. For example, the self-terminal anomaly notification section F10 may be configured to audiovisually notify a user that the controller 11 of the self terminal does not operate normally.

The different-terminal anomaly notification section F11 may use inter-vehicle communication to notify the nearby in-vehicle unit 1B as a diagnosis target that the controller 11 thereof does not operate normally. The in-vehicle unit 1 may acquire a signal from the nearby in-vehicle unit 1 notifying that the controller 11 of the self terminal does not operate normally. For such an occasion, the in-vehicle unit 1 may include a configuration to audiovisually inform the notification.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

What is claimed is:

1. An in-vehicle unit that is mounted on each of a plurality of host vehicles including a subject vehicle and at least one nearby vehicle near the subject vehicle, the in-vehicle unit being used in a system to perform inter-vehicle communication, the in-vehicle unit in each host vehicle, comprising:
- a wireless communicator that transmits and receives information using inter-vehicle communication;
- a system information acquisition section that acquires information indicating a state of a control system to control operation of the in-vehicle unit in each host vehicle; and
- an index data generation section that generates an index data-item including an index value indicating a state of the control system based on the information acquired by the system information acquisition section, the generated index data-item being transmitted via the wireless communicator, wherein a subject in-vehicle unit being the in-vehicle unit used in the subject vehicle further includes:
- a communication processing section that acquires, via the wireless communicator, an index data-item transmitted from at least one nearby in-vehicle unit being the in-vehicle unit used in the at least one nearby vehicle;
- a determination criterion specification section that successively specifies a self-unit determination criterion being a determination criterion to determine whether the control system in the subject in-vehicle unit operates normally, based on the index data-item acquired by the communication processing section from the at least one nearby in-vehicle unit; and
- a self-unit diagnosis test section that determines whether the control system in the subject in-vehicle unit operates normally by comparing the self-unit determination criterion specified by the determination criterion specification section with the index data-item in the subject in-vehicle unit.

2. The in-vehicle unit according to claim 1,
wherein
in the subject in-vehicle unit:
the determination criterion specification section successively specifies a different-unit determination criterion being a determination criterion to determine whether the control system in a target nearby in-vehicle unit as a predetermined diagnosis target among the at least one nearby in-vehicle unit operates normally, based on an index data-item acquired by the communication processing section from the at least one nearby in-vehicle unit; and
a different-unit diagnosis test section is provided to determine whether the control system in the target nearby in-vehicle unit operates normally, by comparing the different-unit determination criterion specified by the determination criterion specification section with the index data-item acquired by the communication processing section from the target nearby in-vehicle unit.

3. The in-vehicle unit according to claim 2,
wherein the index data-item includes a plurality of types of the index value;
wherein in the subject in-vehicle unit:
the determination criterion specification section specifies a normal range, as the self-unit determination criterion and the different-unit determination criterion, based on the index data-item acquired by the communication processing section from the at least one nearby in-vehicle unit,
the normal range being specified as assuming the index value to be normal, with respect to each of the types of the index value in the index data-item;

the self-unit diagnosis test section determines whether the control system in the subject in-vehicle unit operates normally by determining whether the index value in the index data-item in the subject in-vehicle unit falls within the normal range corresponding to the index value with respect to each of the types of the index value; and the different-unit diagnosis test section determines whether the control system in the target nearby in-vehicle unit operates normally by determining whether the index value in the index data-item acquired from the target nearby in-vehicle unit falls within the normal range corresponding to the index value with respect to each of the types of the index value.

4. The in-vehicle unit according to claim 1, wherein the subject in-vehicle unit includes:

a wide area communicator that communicates with a center installed outside separately via a wide area communication network; and a self-unit anomaly notification section that notifies, via the wide area communicator, the center of that the control system in the subject in-vehicle unit does not operate normally in response to that the self-unit diagnosis test section determines that the control system does not operate normally.

5. The in-vehicle unit according to claim 4, wherein:

the subject in-vehicle unit includes a position information acquisition instrument that successively acquires position information indicating a current position of the subject vehicle; and the self-unit anomaly notification section also notifies the center of position information that indicates a current position of the subject vehicle acquired by the position information acquisition instrument, when notifying the center that the control system does not operate normally.

6. The in-vehicle unit according to claim 2, wherein the subject in-vehicle unit includes:

a wide area communicator that communicates with a center installed outside separately via a wide area communication network; and a different-unit anomaly notification section that notifies, via the wide area communicator, the center that the control system in the target nearby in-vehicle unit does not operate normally in response to that the different-unit diagnosis test section determines that the control system in the target nearby in-vehicle unit does not operate normally.

7. The in-vehicle unit according to claim 6, wherein:

the in-vehicle unit used in each host vehicle includes a position information acquisition instrument that successively acquires position information indicating a current position of each host vehicle;

the index data-item is transmitted correspondingly with position information acquired by the position information acquisition instrument, wherein in the subject in-vehicle unit:

the communication processing section acquires, from the at least one nearby in-vehicle unit, the index data-item transmitted correspondingly with position information indicating a current position; and the different-unit anomaly notification section also notifies the center of position information indicating a current position of the host vehicle on which the target nearby in-vehicle unit is mounted, when notifying the center that the control system in the target nearby in-vehicle unit does not operate normally.

8. The in-vehicle unit according to claim 1, wherein in the in-vehicle unit used in each host vehicle:

the control system includes a central processing section to perform a predetermined process, memory to temporarily store data used in a process performed by the central processing section, and a storage as a nonvolatile storage medium to store the data used in the process performed by the central processing section; and the index data-item includes the index value corresponding to at least one of an average usage value of the memory per specified time, an average utilization value of the central processing section per specified time, a free space in the storage, and the number of bad sectors in the storage.

9. The in-vehicle unit according to claim 8, wherein in the in-vehicle unit used in each host vehicle, the index data-item is transmitted correspondingly with version information about software the control system uses, wherein in the subject in-vehicle unit:

the communication processing section acquires, from the at least one nearby in-vehicle unit, the index data-item transmitted correspondingly with version information about different-unit software as the software used in the at least one nearby in-vehicle unit; and the determination criterion specification section specifies the self-unit determination criterion based on the index data-item acquired from the at least one nearby in-vehicle unit that uses the different-unit software whose version is equal to the version information about the software used in the subject in-vehicle unit.

10. An in-vehicle unit that is mounted on each of a plurality of host vehicles including a subject vehicle and at least one nearby vehicle near the subject vehicle, the in-vehicle unit being used in a system to perform inter-vehicle communication, the in-vehicle unit in each host vehicle, comprising:

a wireless communicator that transmits and receives information using inter-vehicle communication;

a system information acquisition section that acquires information indicating a state of a control system to control operation of the in-vehicle unit in each host vehicle; and an index data generation section that generates an index data-item including an index value indicating a state of the control system based on the information acquired by the system information acquisition section, the generated index data-item being transmitted via the wireless communicator, wherein a subject in-vehicle unit being the in-vehicle unit used in the subject vehicle further includes:

a communication processing section that acquires, via the wireless communicator, an index data-item transmitted from at least one nearby in-vehicle unit being the in-vehicle unit used in the at least one nearby vehicle;

a determination criterion specification section that successively specifies a different-unit determination criterion being a determination criterion to determine whether the control system in a target nearby in-vehicle unit as a predetermined diagnosis target among the at least one nearby in-vehicle operates normally, based on an index data-item acquired by the communication processing section from the at least one nearby in-vehicle unit; and a different-unit diagnosis test section that determines whether the control system in the target nearby in-vehicle unit operates normally, by comparing the different-unit determination criterion specified by the determination criterion specification section with the index data-item acquired by the communication processing section from the target nearby in-vehicle unit.

11. An in-vehicle unit diagnosis system including a plurality of in-vehicle units respectively provided in a plurality of host vehicles that include a subject vehicle and at least one nearby vehicle near the subject vehicle, the plurality of in-vehicle units performing inter-vehicle communication, the in-vehicle unit in each host vehicle, comprising:

a wireless communicator that transmits and receives information using inter-vehicle communication;

a system information acquisition section that acquires information indicating a state of a control system to control operation of the in-vehicle unit in each host vehicle; and an index data generation section that generates an index data-item including an index value indicating a state of the control system based on the information acquired by the system information acquisition section, the generated index data-item being transmitted via the wireless communicator, wherein a subject in-vehicle unit being the in-vehicle unit used in the subject vehicle further includes:

a communication processing section that acquires, via the wireless communicator, an index data-item transmitted from at least one nearby in-vehicle unit being the in-vehicle unit used in the at least one nearby vehicle;

a determination criterion specification section that successively specifies a different-unit determination criterion being a determination criterion to determine whether the control system in a target nearby in-vehicle unit as a predetermined diagnosis target among the at least one nearby in-vehicle operates normally, based on an index data-item acquired by the communication processing section from the at least one nearby in-vehicle unit; and a different-unit diagnosis test section that determines whether the control system in the target nearby in-vehicle unit operates normally, by comparing the different-unit determination criterion specified by the determination criterion specification section with the index data-item acquired by the communication processing section from the target nearby in-vehicle unit.

* * * * *

UNITED STATES PATENT AND TRADEMARK OFFICE
CERTIFICATE OF CORRECTION

PATENT NO. : 10,339,731 B2
APPLICATION NO. : 15/537252
DATED : July 2, 2019
INVENTOR(S) : Seigou Kumabe It is certified that error appears in the above-identified patent and that said Letters Patent is hereby corrected as shown below:

On the Title Page

Page 2, (56) References Cited, OTHER PUBLICATIONS, Column 2, Line 17, delete "U.S. Appl. No. 15/537,237" and insert -- U.S. Appl. No. 15/537,217 -- therefor Signed and Sealed this
First Day of October, 2019

Andrei Iancu
*Director of the United States Patent and Trademark Office*